US010989518B2

(12) United States Patent
Slettemoen

(10) Patent No.: US 10,989,518 B2
(45) Date of Patent: Apr. 27, 2021

(54) POSITION FINDER APPARATUS AND METHOD USING OPTICALLY PROJECTED REFERENCE

(71) Applicant: Lumincode AS, Klæbu (NO)

(72) Inventor: Gudmund Slettemoen, Klæbu (NO)

(73) Assignee: LUMINCODE AS, Klæbu (NO)

( * ) Notice: Subject to any disclaimer, the term of this patent is extended or adjusted under 35 U.S.C. 154(b) by 0 days.

(21) Appl. No.: 16/466,057

(22) PCT Filed: Dec. 1, 2016

(86) PCT No.: PCT/NO2016/050251
§ 371 (c)(1),
(2) Date: Jun. 3, 2019

(87) PCT Pub. No.: WO2018/101834
PCT Pub. Date: Jun. 7, 2018

(65) Prior Publication Data
US 2020/0033113 A1   Jan. 30, 2020

(51) Int. Cl.
*G01B 11/02* (2006.01)
*G01B 11/00* (2006.01)
(Continued)

(52) U.S. Cl.
CPC ........ *G01B 11/002* (2013.01); *G01B 9/02007* (2013.01); *G01B 9/02012* (2013.01);
(Continued)

(58) Field of Classification Search
CPC ............. G01B 11/002; G01B 9/02007; G01B 9/02012; G01B 9/02019; G01B 9/02087;
(Continued)

(56) References Cited

U.S. PATENT DOCUMENTS

2005/0231465 A1   10/2005   Depue et al.
2010/0277743 A1*  11/2010   Voitsechov ........ G01B 9/02041
356/491

(Continued)

FOREIGN PATENT DOCUMENTS

| EP | 1924400 A1 | 5/2008 |
| EP | 2775268 A1 | 9/2014 |
| WO | 2016195502 A1 | 12/2016 |

OTHER PUBLICATIONS

Farsad, M. et al., "Robust sub-micrometer displacement measurement using dual wavelength speckle correlation", Optics Express, vol. 23, No. 11, p. 14960-14972, XP055343633.
(Continued)

*Primary Examiner* — Tarifur R Chowdhury
*Assistant Examiner* — Jonathon Cook
(74) *Attorney, Agent, or Firm* — Buchanan Ingersoll & Rooney P.C.

(57) ABSTRACT

Deriving data for calibration or improving the positioning of a computer-controlled machine including a movable carrier for changing the position of a first machine part relative that of second machine part. The carrier is moved to a plurality of carrier positions such that the position of the first machine part relative to that of the second machine part changes for each of said plurality of positions. At each carrier position,
(Continued)

a pattern generator attached to the first machine part is illuminated with at least two illuminators such that at least one spatial light pattern is created in space. Position data related to the position of said carrier is recorded and composite images of said at least one spatial light pattern is recorded in at least two different optical configurations of said at least two illuminators, said pattern generator, and at least one camera.

15 Claims, 7 Drawing Sheets

(51) Int. Cl.
    *G01B 9/02*         (2006.01)
    *G01B 21/04*       (2006.01)

(52) U.S. Cl.
    CPC ....... *G01B 9/02019* (2013.01); *G01B 21/042* (2013.01); *G01B 2290/70* (2013.01)

(58) Field of Classification Search
    CPC .. G01B 21/042; G01B 2290/70; G01D 5/266; G01D 5/32; G01D 5/344; G01D 5/345; G01D 5/347; G01D 5/36; G03F 7/70775; G03F 9/70
    See application file for complete search history.

(56) References Cited

U.S. PATENT DOCUMENTS

| | | | | |
|---|---|---|---|---|
| 2015/0168131 A1* | 6/2015 | Holzapfel | .............. | G01B 11/14 356/499 |
| 2015/0338205 A1* | 11/2015 | Zhang | .................... | G01D 5/266 356/487 |
| 2016/0209248 A1* | 7/2016 | Hasler | ........................ | G01S 5/16 |
| 2017/0089737 A1* | 3/2017 | Xie | ........................... | G01D 5/38 |

OTHER PUBLICATIONS

International Search Report (PCT/ISA/210) dated Apr. 3, 2017, by the European Patent Office as the International Searching Authority for International Application No. PCT/NO2016/050251.

Khodadad, D. et al., "Full-field 3D deformation measurement: comparison between speckle phase and displacement evaluation", Applied Optics, vol. 55, No. 27, pp. 7735-7743, Sep. 20, 2016. XP055344207.

Written Opinion (PCT/ISA/237) dated Apr. 3, 2017, by the European Patent Office as the International Searching Authority for International Application No. PCT/NO2016/050251.

\* cited by examiner

POSITION FINDER APPARATUS AND METHOD USING OPTICALLY PROJECTED REFERENCE

BACKGROUND OF THE INVENTION/DESCRIPTION OF RELATED ART

The present invention relates to the field of devices and methods for finding exact translations and rotations within computer controlled machines such as machine tools, opto-mechanical measuring devices, coordinates measuring machines (CMM), robots, and as position encoders. More specifically the invention relates to the rigid body translation and rotation calibration at a plurality of machine part positions, or simultaneous translation and rotation reading within such devices.

Referring to XYZ coordinate axes, by the translation of a part is in the following meant the X,Y,Z coordinate of a specific location on that part. By the rotation of the same part is meant the Rx,Ry,Rz rotation angles of that part, where Rx, Ry, and Rz refer to rotation angles around the given X, Y, and Z axes, respectively. By the position of a part is in the wider sense meant either the combined translation and rotation, the translation, or the rotation of a part. Typically, the above-mentioned machines use translation reading devices, so called encoders, to read the exact translation of different parts of the machine. If, for example, such a machine is built with three translation degrees of freedom, XYZ, and one rotation angle degree of freedom, $\theta$, linear encoders are placed at each of three respective X, Y and Z-carriers, and an angular encoder is placed at a rotation axis of a $\theta$ carrier of the machine. However, these encoders are usually located at a distance from the work area (or work space) of the machine; otherwise the encoders would come into conflict with the work area operations of the machine. As a consequence, in order to determine the translation of a specific machine part or tool in said workspace, translations and rotations of several machine parts need to be determined from measurements made by the respective encoders. By using geometrical information and performing geometrical calculations based on said measurements, the translation and rotation of said specific machine part, or typically the translation and rotation of a tool located in the work space of the machine, is derived. However, mechanical irregularities, clearance, and/or mechanical play, affect machine part movements. Thus, translation and rotation offsets between the encoder reading positions and the work area operation positions, introduce hard-to-measure offsets associated with each respective degree of freedom, whose offsets are not accounted for in said geometrical calculations, and which in its turn leads to a certain degree of uncertainty and error of the determined machine part positions.

In order to measure and calibrate the 3D (three dimensional) positioning of e.g. machine tools, opto-mechanical devices, and encoders, so called touch probes are typically used. A touch probe can be mounted into the machine tool tool-holder and, for measurement purposes, be moved to touch the calibrated position of gauges like steel balls or bars. This is a time-consuming point by point process and requires that expensive dimension calibrated gauges are mounted and used.

Typically, an encoder measures the 1D (one dimensional) translations along a bar or, to read a rotation angle, the 1D rotation on a periphery of a rotating shaft. It may be complicated and expensive to expand the same processes to simultaneously read both translations and rotations for some, or all of the 6 (3 translations+3 rotations) possible mechanical degrees of freedom of a rigid body. Present day encoders may, also due to accuracy limitations, not be very suitable for reading the difference between e.g. the translations along two bars and possibly extrapolate those difference translations into values for translations for locations reaching far outside the bars.

In the literature, such as Christopher J. Dainty ed. in Laser Speckle and Related Phenomena, Springer Verlag, Berlin 1974, a range of so called speckle photography and speckle interferometry techniques are described. The main focus of those techniques is on the measurement of object-internal deformations and surface topography. The speckle photography techniques are not able to measure both local translation and rotation angle offsets at a plurality of part positions in the 3D space. Correspondingly, and in addition, interferometric techniques are vibration sensitive, and in many cases, not well suited for industrial applications.

Later on, e.g. Ichirou Yamaguchi et. al. in Applied Optics, Vol. 28, No. 20, Oct. 15, 1989 and Vijay Shilpiekandula in his Master thesis, Massachusetts Institute of Technology, February 2004, describe how a defocused or focused camera can be used to make a rotation angle reading encoder by recording the speckle displacement by use of eq. a camera. This technique also lacks the ability to measure both local translation and rotation offsets at a plurality part positions in the 3D space.

The European patent EP1924400, describes an apparatus and method for finding part position relations of parts of mechanical and opto-mechanical machining and quality control systems, and for recognizing these parts. This technique describes, amongst others, correlation techniques to find image displacement of focused surface structure. But this technique lacks the ability to measure both translation and rotation offsets at a plurality of part positions in the 3D space.

Thus, known mechanical and optical devices and methods, for finding translation and rotations within computer controlled machines, lack sufficient measurement ability, accuracy, or speed, or are too sensitive or error-prone. Further they typically require time-consuming and/or expensive calibration.

In a patent application PCT/NO2015/050102 Gudmund Slettemoen describes how the translation offsets (dAx, dAy) and (dBx, dBy) between minimum two images in minimum two configurations A and B, can be combined to find the translation offsets (Dx, Dy) and rotation angle offsets (Tx, Ty) values between two machine parts. This technique is able to measure both translation and rotation offsets at a plurality of part positions in the 3D space but, since images are captured separately, may be sensitive to drift of light source wavelengths, or mechanical drift of camera or other optical components.

OBJECTIVES OF THE INVENTION

An objective of the invention is to improve accuracy in determination of either part translation or rotation, or both part translation and rotation, within the work space of computer controlled machines. Another objective of the invention is to reduce time needed for calibration of computer controlled machines. Yet another objective of the invention is to provide improvements speed and accuracy for translation and/or rotation correction data to the computer control of machines, or provide solutions that directly work as advanced translation and/or rotation encoders.

SUMMARY

These and other objectives and advantages, which will be understood from the following description of the present invention, are achieved by the device, system and methods according to the appended independent claims. Other aspects of the invention are defined by the appended dependent claims.

According to an aspect, the invention provides a sensor device suitable for use in a computer-controlled machine having a movable carrier for changing the position of a first machine part relative to a second machine part located in the work space of the said computer-controlled machine, the sensor device comprising a first pattern generator attachable to the first machine part, at least first and second illuminators being attachable to the second machine part and configured to illuminate the first pattern generator for jointly creating a three-dimensional light diffraction and interference pattern, hereinafter referred to as a spatial light pattern or as a spatial pattern of light or simply as light pattern, in said work space from light scattered by the first pattern generator, and a camera attachable to the second machine part. The sensor device is configurable to enable the camera to capture a composite image of the spatial light pattern in said work space formed in at least two different optical configurations involving each the camera and a respective one of the first and second illuminators, and the composite image being the image captured in a one and same camera exposure of the spatial light pattern composed of spatial light pattern components generated in respective ones of the different optical configurations. The different optical configurations are different in that a range of effective optical distances of a first optical configuration in which light is propagated along optical paths from a first illuminator via the first pattern generator to the camera for creating a first spatial light pattern component of the spatial light pattern is not overlapping with a range of effective optical distances of a second optical configuration in which light is propagated along optical paths from a second illuminator via the first pattern generator to the camera for creating a second spatial light pattern component of the spatial light pattern. Hence, in a sensor device according to the invention, the effective distance d-e, which is the inverse of the harmonic sum of the distance from the illumination divergence center to the pattern generator d-i, the distance from the camera object plane to the pattern generator d-c, and the effective pattern generator focal length f, of one optical configuration is different from the effective distance d-e of another optical configuration, where (1/d-e)=(1/d-i)+(1/d-c)+(1/f).

In one embodiment, the sensor device of the invention advantageously includes a means for avoiding cross-interference between light of different spatial light pattern components formed in the different optical configurations from appearing in the composite image. Examples of means for avoiding such cross-interference are a laser used in one coherent light illuminator with a wavelength that is different from a wavelength of a laser used in another coherent light illuminator, polarizing optics in the optical paths of the different optical configurations making the state of polarization of light of one light pattern component orthogonal to the state of polarization of light of another light pattern component, shutters, deflectors, or amplitude modulators arranged in the optical paths of the optical configurations so as to cause the light propagated in the paths of different optical configurations to expose the camera photosensitive surface at different times within the one and same composite image exposure time period, and arrangement of optical components ensuring that the minimum angular distance between the spatial light pattern components, as measured from the camera photosensitive surface, is larger than an angular distance determined by the camera pixel size and the wavelength of the light involved.

In an embodiment, the sensor device further comprises storage means for receiving the composite image data from said at least one camera and position data of said carrier, and is configured to receive composite images of the spatial light pattern in at least a first and second different optical configurations of said at least first and second illuminators, said camera, and said pattern generator.

According to an aspect of the invention, the at least first and second illuminators are configured to illuminate the pattern generator with at least partially coherent light. Advantageously, the higher the degree of coherence of the light is, the wider the spatial light pattern extends in space.

According to another aspect, the sensor device of the invention advantageously includes a second pattern generator attachable to the second machine part, and is configured so as to capture with the camera a composite image of the spatial light pattern formed using the second pattern generator in a third optical configuration in addition to said first pattern generator in said first and second optical configurations. In that case, at least one of the illuminators is arranged so as to also illuminate the second pattern generator for creating a third spatial light pattern component of the spatial light pattern.

According to another aspect of the invention, for the purpose of creating reference images, the sensor device configuration means is operable to enable the camera to capture reference images of light patterns formed separately in respective ones of the different optical configurations involved.

A system according to an aspect of the invention comprises a sensor device according to any one of the aspects above, and a storage means carrying a reference database. The reference database comprises interrelated reference image and carrier position data representing the exact translation and rotation of a reference machine part relative to the pattern generator. The provision of the reference database makes it possible to associate composite images recorded in a first computer-controlled machine to reference images recorded previously, or later, in a second computer-controlled machine or in the first computer-controlled machine. The second machine is a reference machine in which are used the same optical configurations as in the first machine when recording reference images.

According to an aspect, the system further comprises a processing means configured to process said recorded composite image data together with reference image data for finding sets of corresponding images, to derive image translation offset data for each set of corresponding images, and to derive position data for calibration of the computer-controlled machine based on image translation offset data associated with a plurality of different optical configurations. The processing typically involves comparing recorded composite image data and reference image data, and the set of corresponding images is typically a pair of corresponding images. The processing means enables the system to automatically determine the correspondence of composite images to reference images, and to derive, on basis of determined correspondence, position data for calibration of the computer-controlled machine.

Another aspect describes a method of recording data associated with the relative translation and rotation of a first and a second part of a computer-controlled machine. The computer-controlled machine comprises movable carriers for changing the position of the first machine part relative to the second machine part. The method comprises the steps of moving the carriers to a plurality of positions. At each position, the illuminators are used to illuminate a pattern generator attached to the first machine part such that a spatial light pattern is created. Also at each position, a composite image of said spatial light pattern, formed in at least two different optical configurations, is recorded using said illuminators, and at least one camera. Such a method enables quick and accurate capturing of data associated with the translation and rotation of the first machine part relative to the translation and rotation of the second machine part. Thus, the method enables dense sampling of translation and rotation offsets in a computer-controlled machine, such as a machine tool or a coordinate measuring machine. Thus, by recording composite images the method is less sensitive to drifts of light source wavelengths, mechanical drift of components of the computer-controlled machine, and mechanical drift of optical components and cameras.

According to an aspect the method comprises the further method step of at each position recording the position of said carriers.

According to an aspect, at each position a plurality of said illuminators are controlled to concurrently or alternately illuminate the pattern generator.

According to an aspect, a method of deriving data for calibration of a computer-controlled machine is provided. The computer-controlled machine comprises a movable carrier for changing the position of a first machine part relative to a second machine part. This method comprises the steps of providing first and second machine parts of the computer-controlled machine with respective element of the sensor device of the invention; moving the carrier to a plurality of carrier positions, such that the position of the first machine part relative to the second machine part changes for each position; at each carrier position, operating the sensor device of the invention, wherein the illuminators are operated for illuminating a pattern generator attached to the first machine part such that the spatial light pattern is created; at each carrier position, position data related to the position of said carrier is also recorded; at each carrier position, a composite image of the spatial light pattern is captured and recorded in at least two different optical configurations of said at least two illuminators, said first pattern generator and at least one camera; for each respective carrier position, pairs of similar light pattern data are found by comparing said recorded composite image data with reference image data of a reference database, the said light pattern data comprising interrelated light pattern and position data that are associated with the unique spatial light pattern that is reflected or transmitted from the pattern generator, including the internal pattern generator; and similar light pattern data are analysed to derive light pattern translation offset data for each pair of similar light patterns. Furthermore, data for calibration or compensation of the computer-controlled machine is derived based on light pattern translation offset data associated with a plurality of different optical configurations.

According to an aspect the pattern generator is illuminated with at least partially coherent light. The coherence of the light makes it possible to produce the spatial light pattern.

Among the advantages of the invention, is that the recording of reference images of light patterns and the use of these reference images are carried out on different machines. Advantageously, it is also possible that a machine is the reference for its later performance. A further advantage of the invention is its applicability to find and calibrate the translation and rotation of computer controlled machine, as the present invention is advantageously arranged to associate differently configured recordings of light patterns with encoder position readings.

ADVANTAGES

Figure 1:
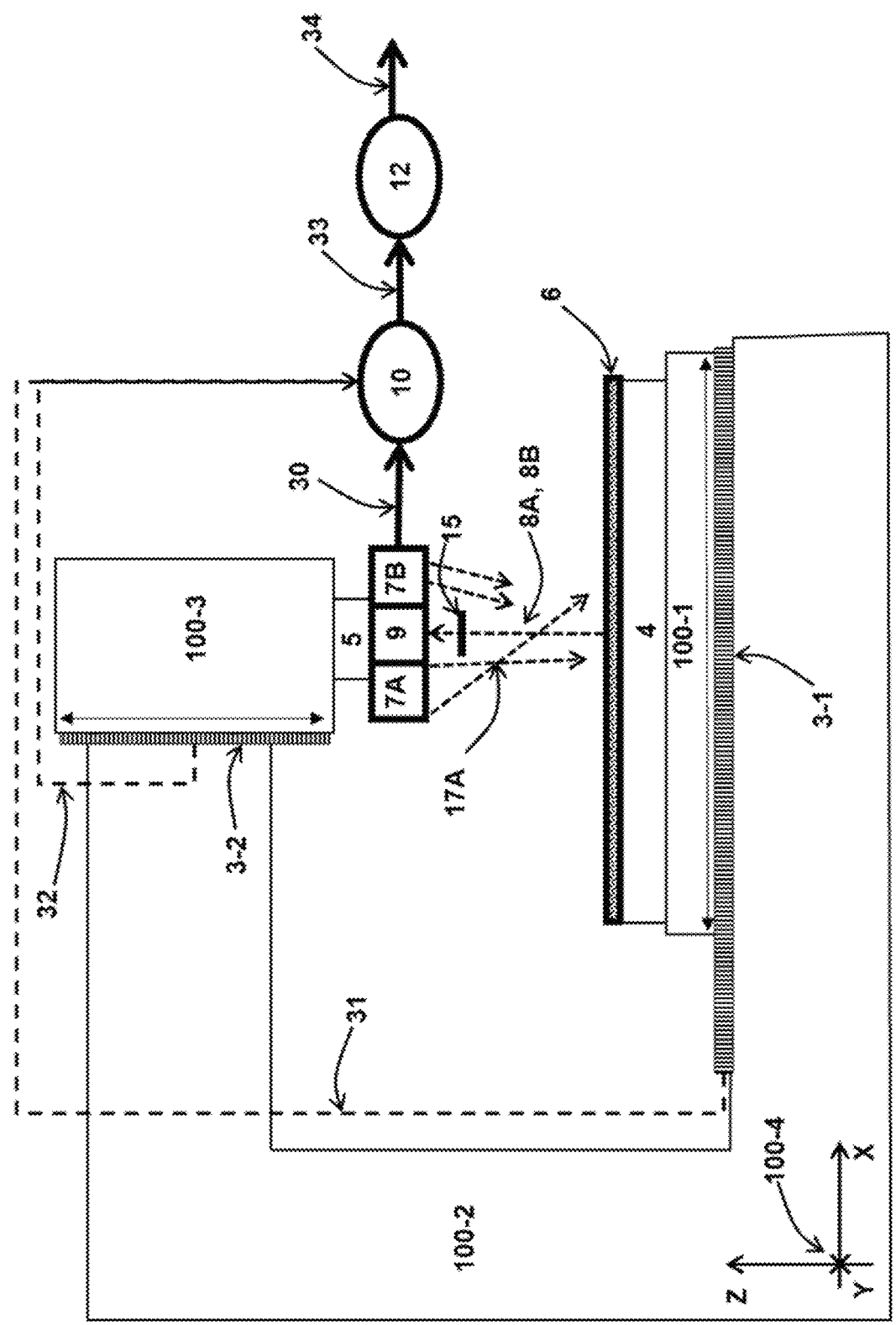
FIG. 1 is a schematic side view drawing illustrating a first exemplary embodiment of a milling machine equipped with a system comprising a sensor device according to the present invention.

The method of this invention enables quick and accurate capturing of data associated with the translation and rotation of a first machine part relative to the translation and rotation of a second machine part. Thus, the method enables dense sampling of translation and rotation offsets in a computer-controlled machine, such as a machine tool or a coordinate measuring machine, relative those of a reference machine. This is accomplished by the comparison of a composite image of a spatial light pattern formed by minimum two optical configurations with the images in a reference database, where the images in the reference database are images of reference spatial light patterns formed separately by the different configurations. The comparison that rely on interrelated spatial light pattern and position data associated with the spatial optical characteristics of a pattern generator, makes it possible to compare the position of a spatial light pattern, captured and recorded in a first computer-controlled machine, to reference spatial light patterns captured previously, or later, recorded in a reference computer-controlled machine, such as a coordinate-measuring machine or a calibration setup, using the same optical configurations. Thereby it is possible to accurately determine translation and rotation offsets at each sample position and to use the offset data to derive data for position calibration or compensation of the first computer-controlled machine. The calibration data can be used to read or control movement of the first computer-controlled machine, such that its movement is corrected for by the movement of the reference machine used to record the reference data. By simplifying image capturing the present invention also expands the scope of the applications that are derivable from the patent application PCT/NO2015/050102.

By associating exact positions and angles of optical configurations of cameras and illuminators with the position and angle of a physical part, herein referred to as the pattern generator, the present invention enables the exact tool holder translation and rotation in a computer controlled machine to be found by bringing the pattern generator, or a true sister replica of the pattern generator, from one machine (reference) to the other, and by observing the created light patterns with sensor devices defined by the same optical configurations. By capturing composite images the present invention is able to simultaneously both improve speed and accuracy since each composite image contains all necessary position and rotation information about the computer controlled machine at the time when the image is captured. This creates a high degree of reliability and accuracy.

The pattern generator serves very much the same purpose as e.g. the encoder glass bar of a commercial encoder. By capturing composite images the present invention enables recording of translations and rotations of a spatial light pattern in free space outside the pattern generator and uses this information to find the exact translation and rotation offset conditions of machine parts.

The sensor device enables quick and accurate capturing of images associated with the translation and rotation of the first machine part relative to the translation and rotation of the second machine part. Thus, the device enables dense sampling of translation and rotation offsets in a computer-controlled machine, such as a machine tool or a coordinate measuring machine. The provision of minimum two different optical configurations makes it possible to derive reliable information of the translation of the first part relative to the translation of the second part separately from the rotation of the first part relative to the rotation of the second part. Also, since the effective distance of the first optical configuration is different from the effective distance of the second optical configuration, it is possible to record one composite image of said spatial light pattern that contains sufficient translation and rotation information at each sample position. Thereby it is possible to quickly determine translation and rotation offsets at each sample position and to use the translation and rotation offset data to compensate for positioning in the first computer-controlled machine, such that the positioning in the first machine closely resembles the positioning in the reference machine used to record the reference data. Thus, the sensor device more or less eliminates the effect of mechanical irregularities, bearing clearances, and/or mechanical play, all creating machine part positioning errors.

Recording carrier positions makes it possible to associate recorded images of light patterns to recorded carrier positions, and hence to associate positions referring to the coordinate system of a reference computer-controlled machine, such as a laboratory machine, to the positions referring to the coordinate system of another computer-controlled machine, i.e. the computer-controlled machine that is being used. This makes it possible to also produce exact translation and rotation data associated with the pattern generators and that together will work as advanced encoders.

This invention avails the use of a plurality of different optical configurations for each available camera, and thus makes it possible to use even a single camera to capture composite images that simultaneously represent the mechanical state of a multitude of mechanical degrees of freedom and a multitude of machine parts. Also, as a greater number of optical configurations is made to contribute to the spatial light pattern, imaged by the composite image, more translations and rotations from more degrees of freedom are simultaneously measured, or a higher accuracy in determination of translation and rotation offsets is obtained.

DETAILED DESCRIPTION OF THE INVENTION

Example 1

Figure 2:
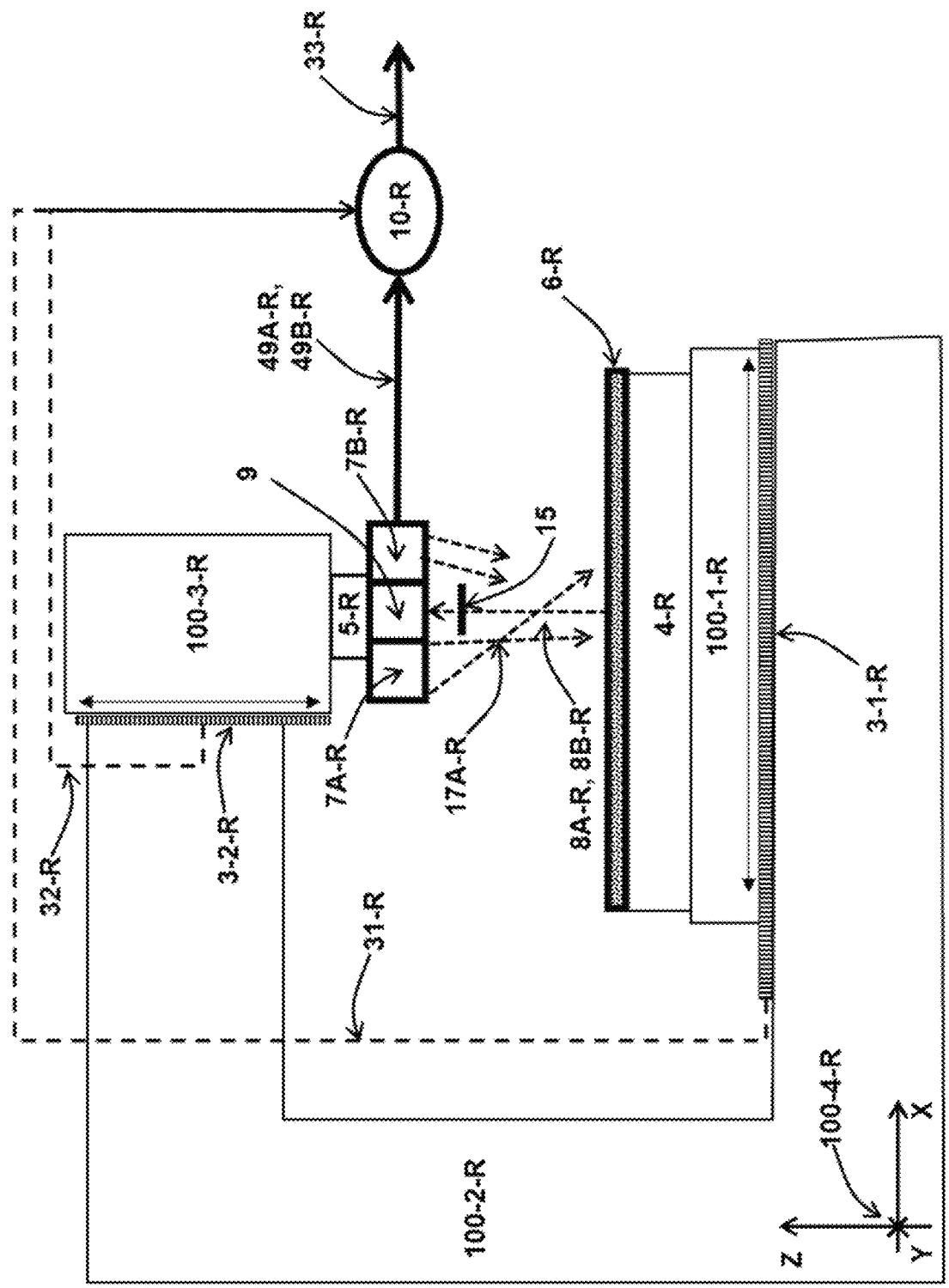
FIG. 2 is a schematic side view drawing illustrating a first exemplary embodiment of a coordinate measuring machine that is equipped with a system comprising a sensor device according to the present invention. This machine is collecting the reference data used by the milling machine, as represented by FIG. 1.

A sensor device 1 according to an embodiment of the invention will now be described with reference to FIG. 1. The sensor device 1 is in this example adapted for alignment and calibration of a milling machine 2. In FIG. 1, the milling machine 2 comprises the work area table 4, the tool holder 5, the support parts 100-1, 100-2, and 100-3, and the carriers 3-1 and 3-2. In the present example, when the carriers 3-1 and 3-2 of the milling machine 2 are mounted, their axes need to be aligned to become orthogonal to each other. Even after the carriers 3-1 and 3-2 have been mechanically adjusted, to align as best as possible with an internal coordinate system 100-4 of the milling machine 2, residual errors may still arise as the carriers move. These errors have to be taken into account if high machining precision is needed. The sensor device 1 is used to find these errors. The present embodiment provides these errors as translation and rotation offsets from corresponding reference data that are separately recorded by use of a CMM (Coordinate Measuring Machine) 2-R, as represented by FIG. 2. These errors are related to the positions of the moving parts of the milling machine 2. In the present example, the milling machine has an internal 3D machine coordinate system 100-4 to which the X-, Y- and Z-carrier positions are referred (note that for simplicity only the X-carrier axis 3-1 and Z-carrier axis 3-2 are schematically shown in FIG. 1). The purpose of the present embodiment is to find a set of translation and rotation offset data that is associated with respective positions of a set of 3D positions within the milling machine working volume. These offset data are used by the machine builder to improve mounting and alignment, or by the machine CNC (Computer Numerical Control) to compensate for errors of the actual X-Y-Z carrier movements that are physically placing the tool into the intended positions in space.

FIG. 1 shows a schematic drawing of the milling machine 2 together with an embodiment of the present invention. The sensor device 1 comprises two illuminators 7A and 7B, and one camera 9. We discriminate between two optical configurations, configuration 11A and configuration 11B. In a configuration in which the illuminator 7A is made operational for illuminating the pattern generator 6, we shall say that the camera 9 belongs to the optical configuration A. Correspondingly, in a configuration in which the illuminator 7B is made operational for illuminating the pattern generator 6, we shall say that the camera belongs to the optical configuration B. By the term "illuminator" is meant a certain combination of a light source and illumination optics. Consequently, also light that originates from the same light source, but follows different optical paths or passes different optics before or after reaching the pattern generator 6, is said to belong to different "illuminators". In this example the illuminators 7A and 7B, and the camera 9 are attached to the tool holder 5, and the pattern generator 6 is attached to the work piece holder 4. Note that another possible setup that would work equally well, is one in which the first and second illuminators 7A, 7B, and the camera 9, are attached to the work piece holder 4, and the pattern generator 6 is attached to the tool holder 5. The pattern generator 6 is a light scatterer, such as for example a piece of material with a light scattering surface, which is suitable for returning or transmitting in a direction towards the Camera 9 at least part of light emitted towards the pattern generator by the illuminators 7A and 7B in a direction towards the Camera 9. In the present document, we shall call the light diffraction taking place as light is reflected or transmitted by the pattern generator 6 interchangeably as either diffraction, reflection, transmission, or scattering. The illuminators 7A and 7B are configured to illuminate the pattern generator 6 for jointly creating a spatial light pattern 8 somewhere in the space between the work piece holder 4 and the tool holder 5, so as to allow the spatial light pattern 8 in said space to be seen by the camera and to be imaged in the image plane of the camera 9, and a composite image to be captured. By optical textbook definition, in general the said space between the work piece holder 4 and the tool holder 5 is called the object space and may extend, as measured from the object plane 15, from minus infinity to plus infinity. Hence, in this example the spatial light pattern 8 comprises a first light pattern component 8A in said space, created by light from the first illuminator 7A scattered by the pattern generator into said space, and a second light pattern component 8B in said space, created by light from the second illuminator 7B scattered by the pattern generator into same said space, and the composite image captured in a single camera shot of the spatial light pattern 8 is formed by both components 8A and 8B. Accordingly, the components 8A and 8B could be separate in time, by light colour, by polarization, angles as seen from the camera photosensitive surface, or by other parameter, as long as they both are imaged by the same camera in the same camera shot. If the components 8A and 8B are separated by angles the minimum angular distance, as measured from the camera photosensitive surface of the camera, between light of the component 8A and light of the component 8B should larger than $2*\arcsin(\lambda/(4*p))$ where arcsin( ) is the trigonometric function, lambda the wavelength of the light involved, and p is the camera pixel size. The terms camera shot, camera exposure, and camera capture are used interchangeably herein for the camera's taking of one still picture or one still image of a sequence of video images. The camera is advantageously configured to capture a 2D (two-dimensional) composite image of said spatial light pattern 8. The sensor device 1 is configured to capture the composite image in at least a first 11A and a second 11B different optical configuration. The said first optical configuration 11A defines the path from said first illuminator 7A, via said pattern generator 6, to said camera 9 which in this configuration is called camera 9A. The said second optical configuration 11B defines the path from said second illuminator 7B, via said pattern generator 6, to said camera 9 which in this configuration is called camera 9B. Each respective optical configuration is hence defined by the relative position of the pattern generator 6, camera 9 and illuminators 7A and 7B. Thus, each composite images captured by the camera 9, in the respective sets of different optical configurations identified by the indices A and B respectively, will be separately unique and directly related to the relative position of the pattern generator 6, the camera 9 and the respective illuminators 7A and 7B.

In a total system embodiment employing the sensor device 1 explained above, the system in addition to the sensor device 1 also comprises a computer hard disk 10 or similar data storage device for storing the interrelated carrier positions 31 and 32 from the milling machine 2 and captured composite images 30 from the camera 9. In the present embodiment, the light pattern created in the optical configuration 11A expose the camera 9 simultaneously with the light pattern created in the optical configuration 11B. I.e. the captured composite image 30 is an image formed of the light patterns components 8A and 8B imaged and captured by the camera in a single camera shot. The computer also contains a processor 12 that is configured to compare previously recorded carrier reference position data 31-R and 32-R with the carrier position data 31, 32 coming from the milling machine 2, and to compare respective previously recorded first image data of a first reference light pattern 8A-R and second image data of a second reference light pattern 8B-R, which have been captured in separate camera shots taken in respective ones of the different first and second optical configurations, with the captured composite image data 30 coming from the camera 9.

The previously recorded carrier reference position data 31-R and 32-R and the previously recorded first reference light pattern 8A-R and second reference light pattern 8B-R image data have been previously recorded in the separate CMM, as represented by FIG. 2, stored on the hard disk 10-R, and transferred to the hard disk 10 of FIG. 1. In FIG. 2, these data are the collected reference data 33-R. In FIG. 1 the collected data 33, received by processor 12 from the hard disk 10, are the collected reference data 33-R, the carrier position data 31 and 32, and the captured composite image 30 data.

Figure 3:
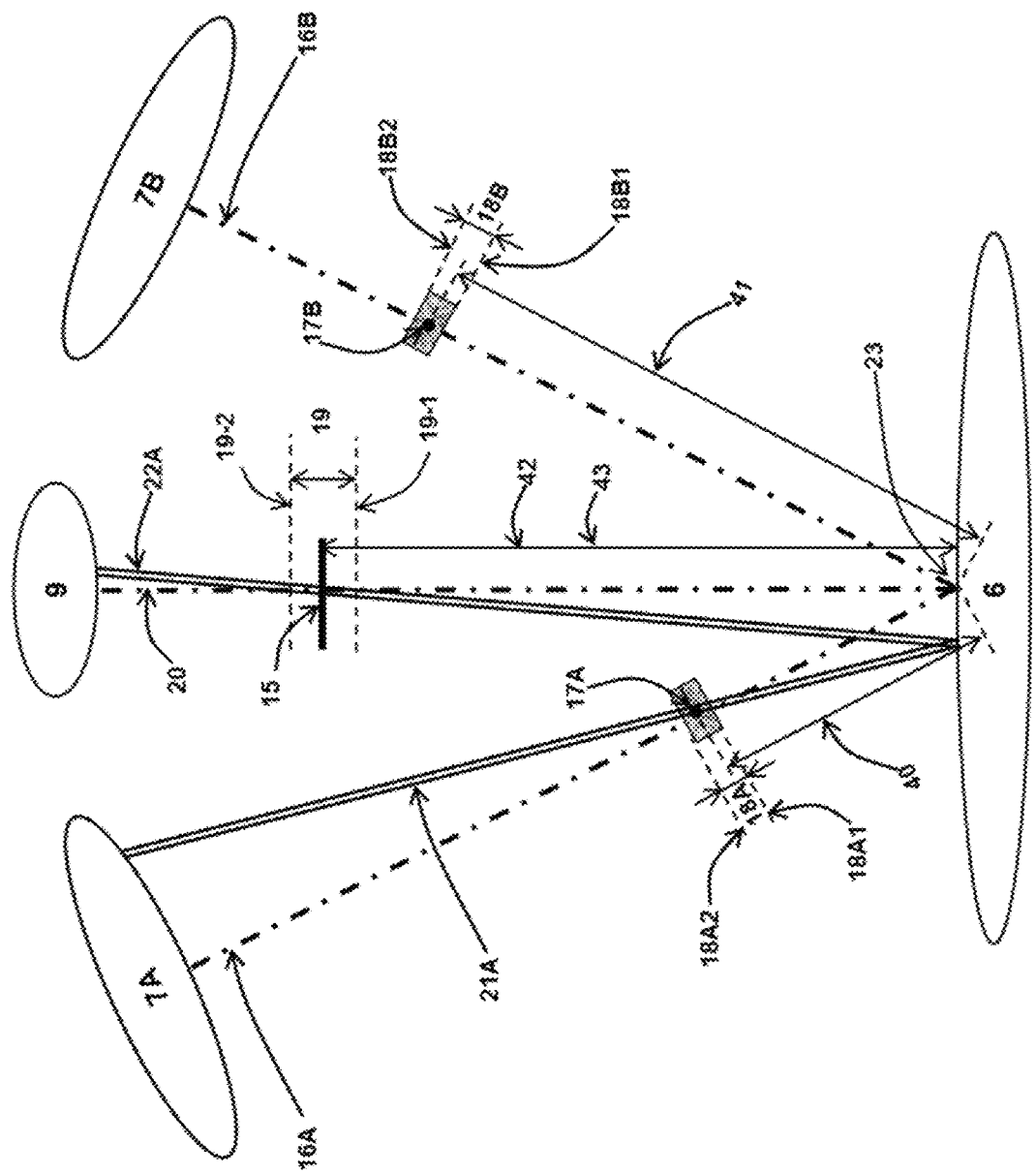
FIG. 3 is a schematic side view drawing representing optical paths and effective distances of the milling machine of FIG. 1 and the coordinate measuring machine of FIG. 2.

The first and second illuminators 7A and 7B, respectively, are of a type that is capable of emitting light suitable for illuminating the pattern generator 6 to create said first spatial light pattern component 8A and said second spatial light pattern component 8B. Typically, illuminators capable of emitting substantially coherent light are suitable for the stated purpose. For the purpose of the present invention, we define the coherence length of an illuminator 7 as the maximum optical path length difference that creates a degree of coherence larger than 10%. In this specific embodiment, the illuminators are laser emitting diodes with a coherence length larger than the largest one of the path length differences within each of the optical configurations A and B. Light emitted from each of the illuminators 7A and 7B follows infinitely many different respective paths. For the optical configuration A, two examples of the paths are shown in FIG. 3, for illustration purposes. The first path is indicated by the dot-dash line that coincides with a first illuminator optical axis 16A going from the first illuminator 7A to the pattern generator 6, and is continued along the dot-dash line that coincides with a camera optical axis 20 going from the pattern generator 6 to the camera 9. The second path is indicated by the fully drawn double line 21A going from the first illuminator 7A to the pattern generator 6, and is continued along the fully drawn double line 22A going from the pattern generator to the camera 9. By considering all possible optical paths and path lengths from the first illuminator 7A, via the pattern generator 6, to the camera 9, the laser diode source of the illuminator 7A should emit light of a coherence length that is larger than the maximum difference in length between these optical paths. The same coherence condition should separately also be met by the B configuration that involves the second illuminator 7B, pattern generator 6, and the camera 9. However, the optical wavelength of the illuminator 7A should be sufficiently different from the optical wavelength of the illuminator 7B to avoid that the cross-interference between the light pattern components 8A and 8B do not appear in the composite image 30. The camera 9 is typically a 2D electronic camera of type CCD (Charge Coupled Device) or CMOS having preferably a resolution of 1000×1000 pixels or better. The pattern generator 6 is suitably provided by a plane/flat stainless steel plate. Other materials, such as aluminium and glass, could be used within the scope of the invention to provide the pattern generator 6, as long as the reflection surface of the pattern generator 6 is suitable for creating the intended spatial light pattern components 8A,8B. The pattern generator 6 could also be provided by a reflection hologram, or by a metal surface light pattern replica evaporated onto a glass plate surface, or by an embossed imprint from a master surface on to another suitable surface. However, a key requirement is that the surface details do not change with time, such as for example due to corrosion, handling, or similar. In the present embodiment, the reflection surface of the steel plate has a surface roughness that is comparable to the laser light wavelength emitted by the illuminators 7A, 7B, thereby creating sufficient angular range of scattering angles and sufficient amount of light to be detected by the camera 9. In this embodiment, a computer contains the hard disk 10 and the processor 12. To receive the carrier position data 31 and 32, respectively, the computer is connected to the milling machine, CNC, through an Ethernet cable, and the computer receives composite images 30 from the camera 9 through the use of a USB port cable connection or a FireWire port cable connection. The reference position data 31-R and 32-R, respectively, and the images of the individual reference light pattern 8A-R and 8B-R, respectively, are conveniently transferred from the reference data hard disk 10-R to the hard disk 10 by use of a USB type memory stick or similar portable data storage device.

In the following a method according to an embodiment of the invention will be described with reference to FIGS. 1, 2, and 3. The sensor device 1, described above, or a sensor device 1-R with the same optical configurations is used to record the reference data stored in the hard disk 10-R, the storage means 10-R of FIG. 2. In order to record images of the reference light patterns 8A-R and 8B-R, respectively, and reference carrier position data 31-R and 32-R, respectively, in the present embodiment we shall rely on a calibrated Coordinate Measuring Machine, hereinafter referred to as the CMM 2-R. Schematically this CMM 2-R is similar to the milling machine 2, but represented by FIG. 2. This CMM is programmed to move, in the present embodiment, stepwise between sampling positions in a fixed 3D matrix of positions. The number of positions would strongly depend on the user and its application. If the milling machine 2 should only be checked for assembly quality 5×5×5 positions may be sufficient. Otherwise, if detailed feedback correction data to the CNC are needed a high number such as 1000×1000×1000 might be needed. In the present example, these positions cover a volume of 400×400×400 mm. In general, the distribution of sampling positions may be anything from a linear 1D array, to a 2D matrix, to the above-mentioned 3D matrix, where the positions in some cases also favourably are unequally distributed. For each of these positions the computer hard disk 10-R stores two images 8(49A-R, 49B-R), one for each optical configuration 11A-R, 11B-R, together with the corresponding carriers position data 31-RA, 32-RA, 31-RB, and 32-RB. Assuming the CMM is mechanically stable during image recordings the carrier position 31-RA is equal to the carrier position 31-RB, and the carrier position 32-RA is equal to the carrier position 32-RB. These data are the reference data for the subsequent milling machine 2 production/service alignment activities, and will in due time be transferred from the hard disk 10-R (FIG. 2) to the hard disk 10 (FIG. 1). The light sources (not shown in the Figures) of the first and second illuminators 7A-R, 7B-R are laser diodes of the same type and coherence characteristics to later be used in the milling machine 2. In the present embodiment, and as schematically indicated in FIG. 2, and also corresponding to the configuration of the milling machine in FIG. 1, the first illuminator 7A-R provides focused light with its focus position, which is also its divergence center 17A-R, located between the first illuminator 7A-R and the pattern generator 6-R. The laser light diverges from this divergence center 17A-R towards the pattern generator 6-R. The second illuminator 7B-R, as also schematically indicated in FIG. 1, contains optics to provide collimated light that propagates towards the pattern generator 6-R. I.e. its divergence center 17B-R is in this example set at infinity and consequently cannot be shown within the extend of the FIG. 2 drawing. FIG. 3 schematically shows the illumination/observation geometries of the two optical configurations A and B and represents the optical configurations both used on the milling machine 2, schematically represented by the FIG. 1 drawing, and the CMM 2-R, schematically represented by the FIG. 2 drawing. For clarity both divergence centers 17A-R and 17B-R, corresponding to the divergence centers 17A and 17B, are shown within the extents of FIG. 3, although in the present embodiment the divergence center 17B of the second illuminator 7B is set to infinity. As also illustrated in FIG. 3 the camera imaging characteristics are defined by an object plane position and size 15 and a corresponding depth of field 19 centered on this object plane. The depth of field extends from the plane 19-1 to the plane 19-2 respectively. In the present example, the object plane is located in between the camera 9 and the pattern generator 6. The camera optical axis 20 is defined to go through two points in space, the first point is the entrance pupil center of the camera 9 and the second point is the object plane 15 center. The camera optical axis 20 extends to define a point 23 where the camera 9 optical axis 20 meets the pattern generator 6. As also illustrated in FIG. 3 the illuminators optical characteristics are defined by respective divergence centers 17A and 17B, and respective corresponding depths of field 18A and 18B centered on these respective divergence centers. The depth of field of illuminator 7A extends from the plane 18A1 to the plane 18A2. Correspondingly the depth of field of the illuminator 7B extends from the plane 18B1 to the plane 18B2. For clarity in the present example, the divergence centers are located in between the respective illuminators 7A, 7B and the pattern generator 6. Each of the illuminators optical axes 16A, 16B is defined to go through two points in space, their respective divergence centers 17A, 17B to the point 23 where the camera optical axis 20 meets the pattern generator 6. The illuminator's divergence center distances diA 40, diB 41 are measured along their respective optical axis 16A, 16B from the divergence centers 17A, 17B to the reflection surface point 23 on the pattern generator 6. The camera object plane distances dcA 42, dcB 43 are in the present example equal and measured along the optical axis 20 from the reflection surface point 23 on the pattern generator 6 to the object plane 15. Note that these geometries change during the CMM 2-R reference recording and milling machine 2 measurements as the CMM carriers 3-1-R, 3-2-R, and milling machine carriers 3-1, 3-2 move. The defined axis, positions, and distances will change during those processes. The effective distance of the first optical configuration A is given by the equation deA=diA*dcA/(diA+dcA), and in the same way the effective distance of the second optical configuration B is given by the equation deB=diB*dcB/(diB+dcB). If the pattern generator 6 is a curved reflector, or contains a lens effect in transmission, diA and diB in the above equations should be replaced by the respective equations diA*f/(diA+f) and diB*f/(diB+f), where f represents the equivalent focal length of an equivalent pattern generator where the surface of the pattern generator 6 is replaced by an optically smooth surface without roughness. If for example the pattern generator 6 is curved with a signed radius of curvature of R, then the focal length f would be equal to R/2. For each of these optical configurations the depth of field defines a range within which an object is considered to be in focus. These ranges extend in the present example from the field plane 19-1 to the field plane 19-2, making the object plane distance dcA 42, dcB 43 range from respectively dcA1=dcB1 to dcA2=dcB2. Correspondingly the illuminators may cover different distances ranging from the respective divergence plane 18A1 to 18A2, and from 18B1 to 18B2, making the divergence center distances diA 40, diB 41 range from respectively diA1 to diA2, and diB1 to diB2. Inserted for dcA1, diA1, dcA2, and diA2 into the equation for the first effective distance deA, we get a range of effective distances that extend from deA1 to deA2. Correspondingly, if we insert for dcB1, diB1, dcB2, and diB2 into the equation for the second effective distance deB, we get a range of effective distances that extend from deB1 to deB2. Typically, the depth of field for the cameras and illuminators involved is +/−(2*lambda*F*F), where lambda is the optical wavelength, and F is the effective optical F-number, referring to the pattern generator 6 side. By the effective F-number we mean the F-numbers that define the angular extend of the illuminators exit pupils and the camera entrance pupils through the equation F=1/[2*sin(v/2)], where v is the angular extent of those pupils as observed from the divergence centers and object planes. Note however, that the illuminators and camera may be configured with different F-numbers. Also, note that in alternative optical configurations the illuminators 7A, 7B may contain astigmatic foci so that the divergence centers 17A, 17B are at different illumination distance diA (40 in FIG. 3) and diB (41 in FIG. 3) when observed in one transversal direction, say parallel to the X-axis, to the corresponding divergence center distances when observed in the orthogonal transversal directions. In other alternative optical configurations, the same is the case with the camera imaging properties making in general the object plane position 15A and 15B be placed at different camera object plane distance dcA (42 in FIG. 3) and dcB (43 in FIG. 3) when focused on features in two orthogonal transversal directions. Astigmatic performance is typically obtained by including cylindrical optics in the illumination and/or observation paths. The optical configurations A, B are configured such that their effective distances do not overlap, i.e. for each sensor device 1 location any effective distances ranging from deA1 to deA2 should not be equal to any effective distances ranging from deB1 to deB2. If alternative optical configurations contain astigmatic divergence centers 17A, 17B, or astigmatic object plane positions 15A, 15B, the requirement is that the effective distance for the optical configurations A, B should not overlap for each of the transversal directions evaluated separately. For better image analysis performance, the range of effective distances should be separated, as increasing the separation of the effective distances makes it easier to discriminate between the translation and rotation offsets, wherein influence from measurement errors thus is reduced.

Since the pattern generator 6 is illuminated by coherent laser light, a structurally stable spatial light pattern 8 in the 3D space above the pattern generator 6 is created. This spatial light pattern 8 is observed by means of the camera 9. Each of the optical configurations A and B creates a light pattern different from the other one. Typically, these light patterns are unique for all the different recording positions. If the carriers 3-1, 3-2, and 3-1-R, 3-2-R, are controlled to record an image at a first recording position at a first time T1, then moved to record images at subsequent recording positions, and finally moved back to record an image at exactly the first position at a second time T2, the image of the light patterns recorded at time T1 will be exactly reproduced at time T2. But even very small positional offsets between the first and second time of recording, such as 0.01 μm, may affect the light pattern positions and are hence detectable.

After the CMM reference recordings are completed, using the sensor device 1-R according to the present embodiment, or a similarly optically configured sensor device 1, the collected reference data 33-R, recorded on the hard disk 10-R, is used to quantify misalignments while assembling, using, or servicing the milling machine 2. Once quantified, the misalignments are used to improve machine alignment and/or control subsequent CNC movements of the milling machine 2. This achieves better positioning regardless of any mechanical translational and rotational irregularities in the milling machine 2, not possible to be corrected for using customary calibration and alignment methods. The sensor device 1, containing the same optical configurations A, B as used to record the CMM 2-R reference data, is used. FIG. 1 shows a schematic illustration of the milling machine 2. In the present embodiment, the pattern generator 6-R is moved to the milling machine and called the pattern generator 6. But the present embodiment would work equally well if both the pattern generator 6-R and the pattern generator 6 are exact replicas of the same master. The new positions of the illumination-camera assembly 7A, 9, 7B relative to the pattern generator 6 should closely reproduce those of the CMM machine. In order to make that happen the illuminator-camera assembly 7A, 9, 7B and the pattern generator 6 need to be pre-aligned. For that purpose, the use of prepositioned mechanical locators or an iterative mechanical alignment of the pattern generator 6 position is to be carried out. The milling machine 2 CNC-control is then used to move the illuminator-camera assembly 7A, 9, 7B into the neighborhoods of one of the previously CMM 2-R recorded positions relative to the pattern generator 6, then optically observe/measure the offsets, then mechanically move the pattern generator 6, and then repeat the alignment process until the positions somewhat match.

Alternatively, it is possible to mechanically align the illuminator-camera assembly 7A, 9, 7B relative to the pattern generator 6 just by manual use of rulers/calipers or other alignment tools such as a touch probe or similar.

After pre-alignment, this milling machine 2 setup is ready to find its exact alignment, as measured relative to the CMM 2-R reference recordings. The collected reference data 33-R, represented by the series of corresponding reference carrier position data 31-R, 32-R and images 49A-R, 49B-R representing the reference light pattern data 8A-R, 8B-R, are copied to the hard disk 10. The milling machine 2 is then instructed to nominally step between the previous nominal positions, those that corresponds to those recorded by the reference CMM 2-R. For each of these positions the computer hard disk 10 receives from the camera 9 the composite images 30 of the spatial light patterns 8, and the corresponding carrier positions 31, 32, recorded simultaneously with each of the composite images 30. For each of these composite images the spatial light pattern 8 is formed in the different configurations 11A, 11B. The translation and rotation of the illumination-camera assembly 7A, 9, 7B relative to the translation and rotation of the pattern generator 6 should nominally be equal to the corresponding translation and rotation used during the CMM 2-R reference recordings. As a consequence, for all positions, the new composite image of the spatial light pattern 8, recorded in the milling machine 2, will be an image of the light pattern components 8A and 8B, respectively, combined. Each of the light pattern components 8A and 8B will separately be similar to the corresponding CMM 2-R reference light patterns 8A-R, 8B-R, respectively. More specifically, the light pattern image representations contain data similar enough for them to be recognized as the same light pattern representations, but with a certain offset and possible slight de-correlation. However, in reference to the camera 9 photosensitive surface, the images of the light pattern components 8A and 8B will generally be displaced with relatively small amounts compared to the images of the respective reference light patterns 8A-R and 8B-R. Referring to the photosensitive surface these 2D light pattern translation offsets we call (DAX, DAY) and (DBX, DBY) respectively. To calculate these offset data, each captured reference image 49A-R and 49B-R of respective one of the reference light patterns 8A-R and 8B-R is mathematically 2 D cross-correlated with the corresponding milling machine 2 composite image 30 (for cross-correlation calculation of images see e.g. the book by Athanasios Papoulis called Systems and Transforms with Applications in Optics, 1968, McGraw-Hill Book Company, New York). Through this arrangement, where the composite image 30 of the spatial light pattern 8, composed of the spatial light pattern components 8A and 8B where the composite image data are formed in both optical configurations 11A and 11B, errors due to laser wavelength and mechanical drift are reduced down to a minimum. For each of the carrier positions 31 and 32 the positions that result in a 2D cross-correlation maximum determines the image offsets (DAX, DAY) and (DBX, DBY) of the two optical configurations A and B. Since the encoders of the reference CMM 2-R carriers 3-1-R, 3-2-R may return slightly different carrier positions 31-R, 32-R from the instructed carrier positions 31, 32 of the machine 2 carriers 3-1, 3-2, even for the same nominal carrier positions, the carrier positions or the measured light pattern translation offset should be corrected for by these possible differences. In the present example, we apply these corrections on the data representing the light pattern translation offsets and call the corresponding corrected image translation offset for (dAx, dAy) and (dBx, dBy). These corrected image translation offsets are caused by a combination of translation offsets (Dx, Dy) and rotation angle offsets (Tx, Ty) of the illuminator-camera assembly 7A, 9, 7B relative to the pattern generator 6. I.e. the corrected image translation offsets are caused by the translation offsets (Dx, Dy) and rotation angle offsets (Tx, Ty) of the milling machine 2 work piece holder 4 relative to the tool holder 5, using the CMM 2-R first part 4-R relative to the second part 5-R positions as references. Dx and Dy represent translation offsets in the x- and y-directions respectively, whereas Tx and Ty represent rotation angle offsets around the x- and y-axis. These offsets refer to the milling machine coordinate axis 100-4 of FIG. 1. The reference carrier positions 31-R, 32-R refer to the CMM 2-R coordinate axis 100-4-R.

In a linear approximation, the relation between the image translation offsets (dAx, dAy) and (dBx, dBy) and the relative part translation offsets (Dx, Dy) and rotation angle offsets (Tx, Ty) is expressed by the four equations
$dAx=m11*Dx+m12*Dy+m13*Tx+m14*Ty$,
$dAy=m21*Dx+m22*Dy+m23*Tx+m24*Ty$,
$dBx=m31*Dx+m32*Dy+m33*Tx+m34*Ty$,
$dBy=m41*Dx+m42*Dy+m43*Tx+m44*Ty$. In these equations, the respective factors (m11, m12, m13, m14, m21, m22, m23, m24, m31, m32, m33, m34, m41, m42, m43, m44) are given by the exact illumination-observation geometries of the first and second optical configurations A, B respectively. In optical text books these factors are calculated by use of diffraction formulas where a given spatial frequency of a specific reflection/transmission object, that redirects light from a given illumination direction to a given observation direction, is given by the difference between the observation an incident wave vectors. Variations of these formulas are in many cases also called the grating equations. As long as the effective distance deA, for creating the light patterns 8A, 8A-R of the optical configuration A, differs from the effective distance deB, for creating the light patterns 8B, 8B-R of optical configuration B, then the above equations are inverted to find the the work piece holder 4 translation and rotation offsets relative to the tool holder 5, as expressed by the translation offsets (Dx, Dy) and rotation angle offsets (Tx, Ty) values. As a numerical example, we shall assume that illumination distance diA 40 is equal to 60 mm, the camera distance dcA 42 is equal to 100 mm, the illumination distance diB 41 is at infinity, the camera distance dcB 43 is also equal to 100 mm, the coordinate axis XYZ are parallel to the corresponding XYZ coordinate axis 100-4 (FIG. 1) of the milling machine 2, and that the origo is placed at the point 23 (FIG. 3) where the camera 9 optical axis 20 meets the pattern generator 6. For numbers representing the distances see FIG. 3. We shall also assume that the illuminators optical axis 16A, 16B are coaxial with the camera optical axis 20, that the camera magnification is equal to $-\frac{1}{3}$, and that the X- and Y-axis of the camera photosensitive surface are parallel to the corresponding machines X- and Y-axis, as indicated by the milling machine coordinate axis 100-4 (FIG. 1) and CMM coordinate axis 100-4-R (FIG. 2). By coaxial axes we shall mean that the involved axes are parallel. In the present case, the direction of illumination is pointing opposite to the direction of observation. For pattern generators that are illuminated by transmission coaxial axes would mean that the direction of illumination is the same as to the direction of observation. In a linear approximation, these configuration parameters would, for the factors (m11, m12, m13, m14, m21, m22, m23, m24, m31, m32, m33, m34, m41, m42, m43, m44), give the respective values (−0.8889, 0.0, 0.0 mm, −66.667 mm, 0, −0.8889, 66.6667 mm, 0.0 mm, −0.3333, 0.0, 0.0 mm, −66.6667 mm, 0.0, −0.3333, 66.6667 mm, 0.0 mm). We shall also assume that there are no corrections due to the difference between the corresponding carrier positions 31, 32, and reference carrier positions 31-R, 32-R. Then the corrected image translation offsets (dAx, dAy, dBx, dBy) are found to be equal (−59.6, −4.0, −30.7, +2.7) µm respectively. Then these expressions can be inverted to give the searched values for the respective translation offsets (Dx, Dy) as (52.0, 12.0) µm and rotation angle offsets (Tx, Ty) as (100, 200) µRadians. The linear expressions, described above, describe the optical illumination, diffraction, and observation processes. In real applications where the translation and rotation offsets are large, the m-factors, described above, may have to take added non-linear deviations into account. Alternatively, the full non-linear equations are iterated to find the exact solution.

The translation and rotation data 34 represented by the carrier positions 31, 32, the associated part translation offsets (Dx, Dy), and associated rotation angle offsets (Tx, Ty), become the calibration data for subsequent milling machine production, service, or alignment activities. Alternatively, the CNC of the milling machine 2 use these data for compensating the carrier 3-1, 3-2 error movements during milling.

Example 2

Figure 4:
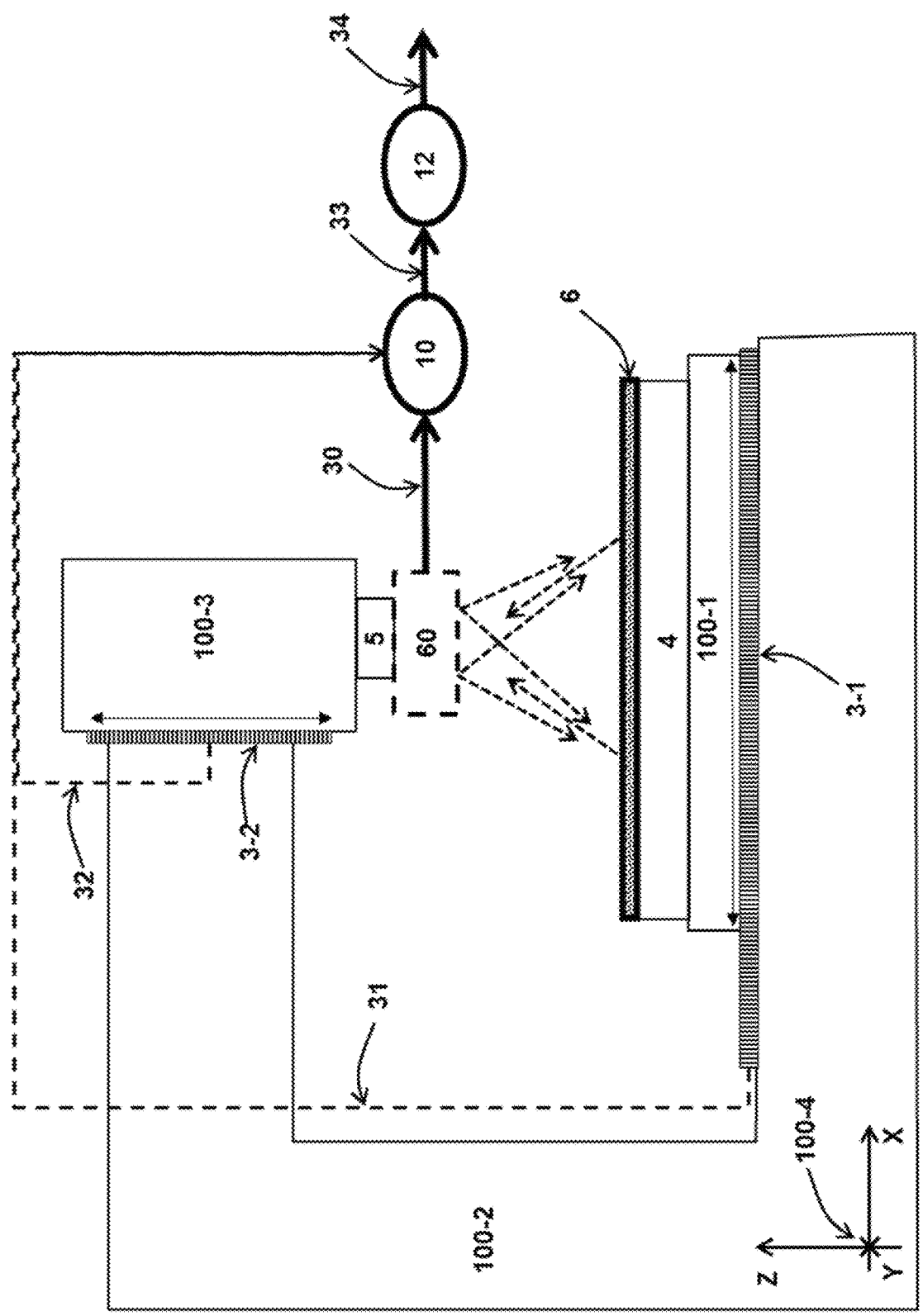
FIG. 4 is a schematic side view drawing of the milling machine of example 1, but equipped with an alternative system comprising a sensor device according to the present invention. The use of this sensor device enables all 6 degrees of freedom (3 translations+3 rotations) of a rigid body movement at a plurality of positions to be found for the milling machine in reference to a coordinate measuring machine with a similarly configured sensor device.
Figure 5:
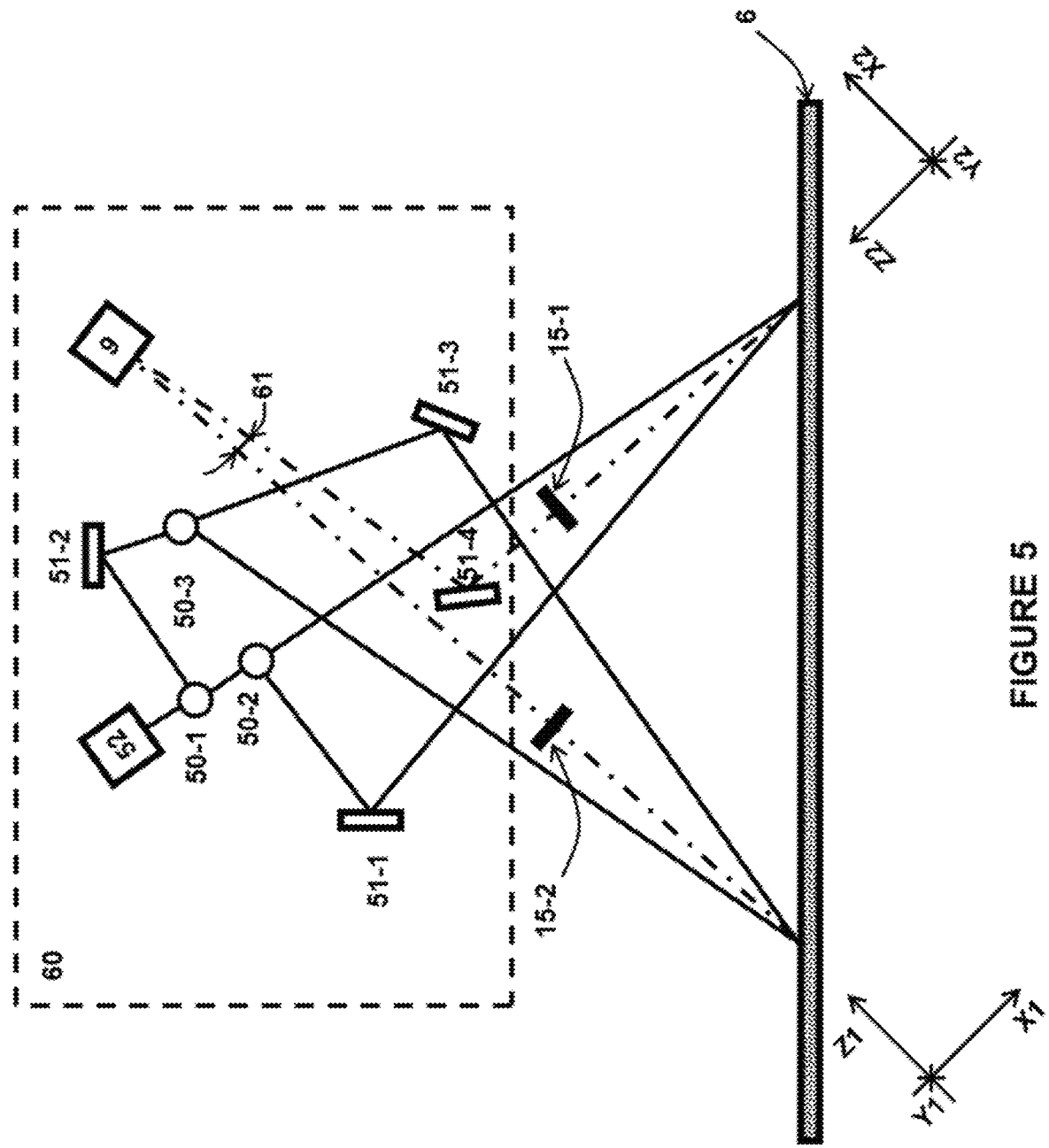
FIG. 5 is a schematic side view drawing representing optical paths and effective distances of the sensor device shown in the milling machine of FIG. 4, and used in a corresponding reference image recording machine.

A sensor device 1 according to an embodiment of the invention will now be described with reference to FIGS. 4 and 5. In general, minimum two optical configurations A, B are necessary to simultaneously find separately the translation and rotation components. But although two different optical configurations are provided in Example 1, a higher number of optical configurations could be provided in other embodiments. A higher number of optical configurations gives more information and provides for a higher number of spatial references, but also requires a larger computational capacity for analysis of data recorded. The exact setup of the optical configurations is varied within the scope of the invention, as long as the light pattern is repeatable, such that it is reproduced over and over again in. An example is schematically shown in FIGS. 4 and 5 that enables all 6 degrees of freedom (3 translations+3 rotations) of a rigid body movement to be found for all carrier positions 31, 32 applied. FIG. 5 shows details of an assembly 60 that in FIG. 4 (dashed line) is fastened to the machine part 5. FIG. 5 shows schematically a setup with four optical configurations 11A, 11B, 11C, 11D that together form four light pattern components 8A, 8B, 8C, 8D that are captured by the camera 9 in the composite image 30. For the purpose of clarity, the outline/border of the different illuminators 7 of this embodiment are not shown in FIG. 5, but their components can be listed by following the paths of the corresponding configurations 11, including their common light source 52. In the present example, the light of configuration 11A follows the path from the light source 52 via the beamsplitter 50-1, beamsplitter 50-2, mirror 51-1, pattern generator 6, mirror 51-4, to the camera 9. The light of configuration 11B follows the path from the light source 52 via the beamsplitter 50-1, beamsplitter 50-2, pattern generator 6, mirror 51-4, to the camera 9. The light of configuration 11C follows the path from the light source 52 via the beamsplitter 50-1, mirror 51-2, beamsplitter 50-3, pattern generator 6, to the camera 9. The light of configuration 11D follows the path from the light source 52 via the beamsplitter 50-1, mirror 51-2, beamsplitter 50-3, mirror 51-3, pattern generator 6, to the camera 9. In the present example, the beamsplitter 50-1 divides the light neutrally 50-50% with respect to the state of polarization while the beamsplitters 50-2 and 50-3 are polarizing cube beamsplitter capable of splitting the light into orthogonal linear polarized light. Provided that the pattern generator 6 acts as a polarization preserving reflector, through this arrangement the light reaching the camera 9 in configuration 11A can be configured to be orthogonally polarized compared to light reaching the camera in configuration 11B. Likewise the light reaching the camera 6 via the path of configuration 11C is arranged to be orthogonally polarized compared to the light following the path of configuration 11D. Through this arrangement the cross-interference between light following the configuration 11A path relative to light following the configuration 11B path will be reduced to a minimum and not appear in the composite image 30. Likewise, through this arrangement the cross-interference between light following the configurations 11A and 11B paths, relative to light following the configurations 11C and 11D paths, will be reduced to a minimum and not appear in the composite image 30. Due to the angles 61 between the light following the configurations (11A, 11B) paths relative to the light following the configurations (11C, 11D) paths the cross-interference between the light pattern components 8A and either one of the light pattern components 8C and 8D, and the cross-interference between the light pattern component 8B and either one of the light pattern components 8C and 8D, is not resolved by the camera 9. I.e. converted to the camera photosensitive surface side the converted angles 61, for all light following the paths of the configurations (11A, 11B) relative to the light following the paths of the configurations (11C, 11D), should be larger than 2*arcsin(lambda/(4*p)) where arcsin( ) is the trigonometric function, lambda the wavelength of the light involved, and p is the camera pixel size. Due to camera 9 internal optics, not shown in FIG. 5, the object plane position 15 is split and in FIG. 5 indicated as 15-1 and 15-2, where object plane 15-1 is the object plane of the configurations 11A and 11B, and the object plane 15-2 is the object plane of the configurations 11C and 11D. In order to record the reference carrier positions 31-R and 32-R, and images of the reference light patterns 8A-R, 8B-R, 8C-R, and 8D-R, the arrangement of FIG. 5 should be placed, together with the pattern generator 6, in a machine having carriers similar to the one schematically shown in FIG. 4. During the reference recording stages the images of the reference light patterns 8A-R, 8B-R, 8C-R, and 8D-R are captured separately in series. This is accomplished by use of shutters (not shown in FIG. 5) to enable the camera to capture those as separate images 49A-R, 49B-R, 49C-R, and 49D-R. Through the calculations, described by Example 1, the use of the reference carrier positions 31-R, 32-R, the images of the reference light patterns 8A-R and 8B-R, the composite image 30, and the carrier position 31 and 32 makes it possible to find two translation and two rotation components of the total 6 rigid body movement of the machine part 4 relative to the machine part 5 and referred to the coordinate axis (X1, Y1, Z1). Through the calculations described by Example 1, the use of the reference carrier positions 31-R, 32-R, the images of the reference light patterns 49C-R and 49D-R, the composite image 30, and the carrier position 31 and 32 makes it possible to find two other translation and two other rotation components of the total 6 degrees of freedom of the movement of the machine part 4 relative to the machine part 5, but now referred to the coordinate axis (X2, Y2, Z2). This gives all together 8 components, of which 2 are redundant, in calculating the 6 degrees of freedom of the rigid body movement between the machine part 4 and 5.

Example 3

Figure 6:
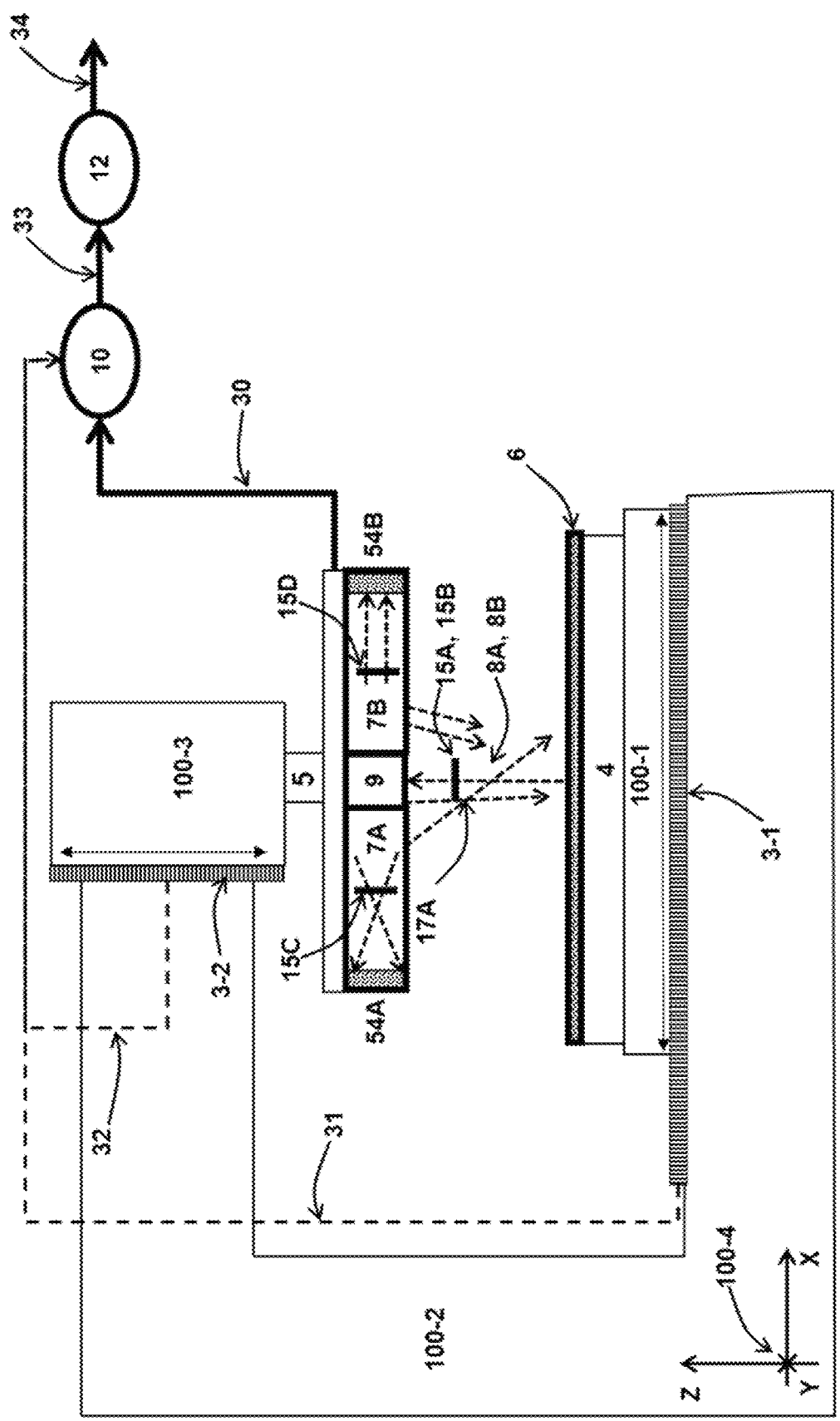
FIG. 6 is a schematic projection view drawing of a vertical milling machine equipped with sensor device according to the present invention, where the sensor device is equipped with additional reference configurations suitable for compensation of the drift of the light source wavelength, or position drift of mechanical and optical components, or mechanical or thermal drift of camera.
Figure 7:
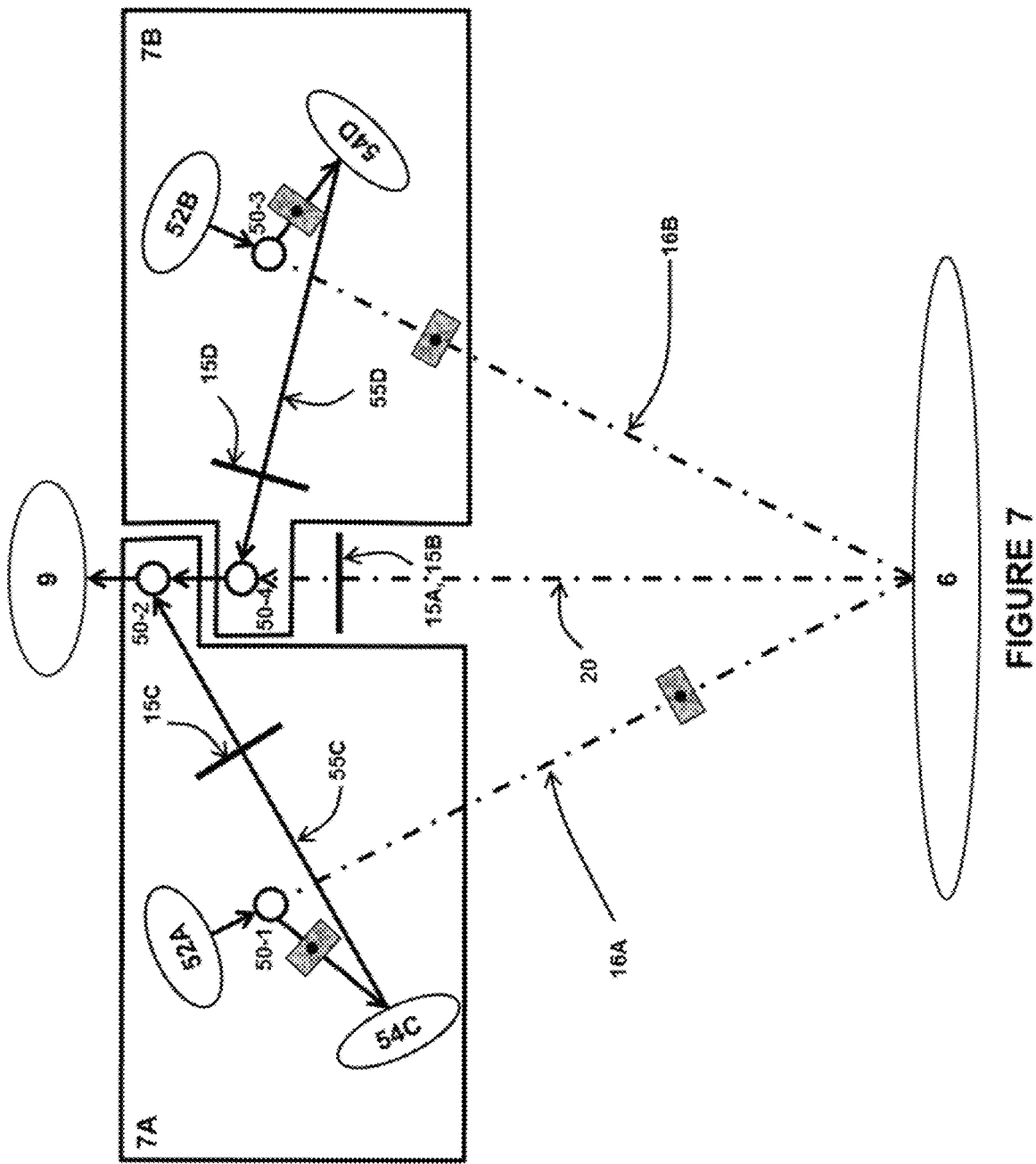
FIG. 7 is a schematic side view drawing representing optical paths and effective distances of the sensor device shown in the vertical milling machine of FIG. 6, and used in a corresponding reference image recording machine.

A sensor device 1 according to an embodiment of the invention will now be described with reference to FIGS. 6 and 7. FIG. 6 shows a setup where details of the illuminators (7) are shown in more detail in FIG. 7. In this embodiment, as also described in examples 1 and 2, a spatial light pattern (8) is created from light originating in the illuminators (7), reflected from the pattern generator (6), and reaching the camera (9). In addition, further "internal" pattern generators (54C, 54D), internal to the respective illuminators (7A, 7B), are added. This creates all together four configurations (11A, 11B, 11C, 11D) of which we call the configurations (11C, 11D) internal. The light reflected from these internal pattern generators (54C, 54D) serve the purpose of creating light pattern components (57C, 57D) that are not influenced by the relative translation/rotation between the machine parts (4) and (5). But they will be influenced by internal changes in the illuminators (7) and camera (9) caused by the respective wavelength drift of the light sources (52A, 52B) and positional drift of the camera photosensitive surface. In this example the light sources (52A, 52B) are diode laser. The wavelength of diode lasers may slightly drift, especially due to temperature drift and laser mode transitions, typically in the range of nanometer and sub nanometer. This wavelength drift reduces the total accuracy of the present sensor device 1 as described by the examples 1 and 2. A key feature of the present invention is the ability to separately capture images of reference light patterns, storing these for later comparison with composite images where some, or all, of the light patterns are exposing the camera photosensitive surface to create composite images. In the present example, a sensor device 1, configured as indicated by the FIGS. 6 and 7, is placed in a laboratory reference machine. This laboratory machine contains temperature stabilized laser diodes, and especially sturdy mechanics and position encoders. This machine moves a machine part (4-R) relative to a machine part (5-R) stepwise in the volume x-y-z and captures separately images of the reference light pattern (8A-R), the reference light pattern (8B-R), the light pattern (57C-R), and the light pattern (57D-R). For each relative machine parts position, to avoid drifts, the laboratory reference machine is configured to capture the four images in series as fast as possible. These images are stored in a reference hard disc (10-R). The reference light pattern (8A-R) is created by light following the path from the light source (52A) and via the beamsplitter (50-1), pattern generator (6), beamsplitter (50-4), beamsplitter (50-2), and to the camera (9). The reference light pattern (8B-R) is created by light following the path from the light source (52B) and via the beamsplitter (50-3), pattern generator (6), beamsplitter (50-4), beamsplitter (50-2), and to the camera (9). The reference light pattern (57C-R) is created by light following the path from the light source (52A) and via the beamsplitter (50-1), pattern generator (54-C), beamsplitter (50-2), and to the camera (9). The reference light pattern (57D-R) is created by light following the path from the light source (52B) and via the beamsplitter (50-3), pattern generator (54D), beamsplitter (50-4), beamsplitter (50-2), and to the camera (9). The circles (50-1, 50-2, 50-3, 50-4) in FIG. 7 represent beamsplitters. In order to avoid that during later operation, where the composite image of the total spatial light pattern (8) is captured, the cross-interference between any of the different light pattern components (8A, 8B) and light pattern components (57C, 57D) appears in the composite image (30), the two laser diodes (52A) and (52B) operate at slightly different wavelengths and the beamsplitters (50-1) and (50-3) are linear polarizing beamsplitters. In addition, the pattern generator (6), and the internal pattern generators (54C, 54D) are metallic reflectors preserving the states of linear polarization. The beamsplitters (50-2, 50-4) are neutral with respect to the polarization directions splitting light equally independently of the different directions of polarization. In FIG. 7 also the four different object planes (15A, 15B, 15C, 15D) of the camera (9) are shown. As described in more detail in example 1, and denoted as "dc", the distances from these object planes to the respective pattern generator (6) and internal pattern generators (54C, 54D) enter into the respective calculations of the effective distances. Likewise, the distances from the four different illumination divergence centers to the respective pattern generator (6) and internal pattern generators (54C, 54D), denoted as "di", enter into the respective calculations of the effective distances. For simplicity, in the present embodiment we assume that for the illuminator (7A) and camera (9) the relative illumination and observation directions, distances, and effective distance to the pattern generator (6) are the same as the relative illumination and observation directions, distances, and effective distance to the pattern generator (54C). Likewise, we assume that for the illuminator (7B) and camera (9) the relative illumination and observation directions, distances, and effective distance to the pattern generator (6) are the same as the relative illumination and observation directions, distances, and effective distance to the internal pattern generator (54D). In order to compensate for the wavelength drift of the laser diode (52A) this makes it possible to later simply subtract the translation shift of the light pattern component (57C) position relative to the light pattern (57C-R) position from the corresponding translation shift of the light pattern component (8A) position relative to the reference light pattern (8A-R) position, and correspondingly subtract the configuration D positions from the configuration B positions, before calculating the corrected image translation offset for (dAx, dAy) and (dBx, dBy) as described in example 1.

The sensor device 1 according to the present embodiment can be used for different applications, such as an encoder in a mechanical translation stage or a robot arm. In the present example, we assume that it is used in an EDM (Electrical Discharge Machine) machine as schematically shown in FIG. 6. To effectively operate the sensor device the EDM machine is made to move the sensor device 1 to approximately the same relative positions between the machine parts (4) and (5), as was recorded during the reference recordings, to find their exact new offsets as expressed by the translation offsets (Dx, Dy) and rotation angle offsets (Tx, Ty) values. But, contrary to the images captured during the reference recordings, composite images (30) of the spatial light pattern (8) are now captured by the camera (9). The spatial light pattern (8) is formed by the two external configurations (11A, 11B) and the two internal configurations (11C, 11D). This ensures that possible mechanical and laser drifts are eliminated as the states of the two configurations (11A) and (11B), and through the introduction of the configurations (11C, 11D) the states of the exact laser wavelengths and camera (9) positions of the two paths, are captured at the same time. Since the corresponding reference light patterns (8A-R, 8B-R) and internal reference light patterns (8C-R, 8D-R) were all captured as separate images, by separately correlating each of these four images with the composite image (30) formed by all four configurations (11A, 11B, 11C, 11D), we find the corrected image translation offset for (dAx, dAy) and (dBx, dBy) as required for finding the translation offsets (Dx, Dy) and rotation angle offsets (Tx, Ty) values between the machine parts (4) and (5). See example1 for a description of how to calculate (Dx, Dy, Tx, Ty) from the values (dAx, dAy, dBx, dBy).

This example describes how minor drift of the light source wavelength, small position changes of internal optical components, or small position displacements of the camera can be compensated for by adding internal configurations to form light patterns, and by ensuring that the camera (9) captures a composite image (30) of the spatial light pattern (8). In another patent application PCT/NO2015/050102 Gudmunn Slettemoen also describes how the translation offsets (dAx, dAy) and (dBx, dBy) between minimum two images in minimum two configurations A and B, can be combined to find the translation offsets (Dx, Dy) and rotation angle offsets (Tx, Ty) values between two machine parts (4) and (5). By adding configurations that create internal reference paths to any of the configurations described in the patent application PCT/NO2015/050102, according to the embodiment described in the present example minor drift of the light source wavelength, small positional changes of internal optical components, or small position displacement of the camera photosensitive surface can also be compensated for in those configurations.

The invention claimed is:

1. Sensor device for a computer-controlled machine having a movable carrier for changing the position of a first machine part relative to that of a second machine part,
wherein the sensor device comprises
a pattern generator attachable to the first machine part,
a first coherent light illuminator and a second coherent light illuminator both being attachable to the second machine part and being optically configured to illuminate the pattern generator with coherent light for creating a spatial light pattern,
a camera being attachable to the second machine part and being optically configured to capture a composite image of said spatial light pattern,
wherein the camera is configured to capture a first composite image of said spatial light pattern in a first camera shot using a combination of said camera and said first one of a coherent light illuminator and said second one of a coherent light illuminator in which a range of effective optical distances of a first optical configuration in which light is propagated along optical paths from said first illuminator via the pattern generator to said camera for creating a first spatial light pattern component of said spatial light pattern is not overlapping with a range of effective optical distances of a second optical configuration in which light is propagated along optical paths from said second illuminator via the pattern generator to said camera for creating a second spatial light pattern component of said spatial light pattern, and
each of said first and said second illuminators being configured to illuminate the pattern generator with coherent light of a coherence length that is larger than a maximum difference in optical path lengths within each of the first and second optical configurations.

2. Sensor device of claim 1, comprising means in at least one of the first and second optical configurations for avoiding optical cross-interference between said first component and said second component appearing in the composite image, said means being at least one of
a) a laser in the first coherent light illuminator with a wavelength that is different from a wavelength of a laser used in the second coherent light illuminator,
b) polarizing optics in the optical paths of the first and second optical configurations, so as to make the state of polarization of light of said first component orthogonal to the state of polarization of light of the second component,
c) an optical component arrangement causing the light of the first optical configuration to enter the photosensitive surface of the camera at angles sufficiently different from the light of the second optical configuration so that the optical cross interference between said first component and said second component is not resolved by the camera, and
d) shutters, deflectors, or amplitude modulators in the optical paths of the first and second optical configurations so as to cause the illuminator create light that is exposing the camera photosensitive surface at different times, within the exposure time of the composite image, compared to the light illuminator.

3. Sensor device according to claim 1, wherein the sensor device is configurable to enable said camera to capture in a second camera shot a second image of the first component of the spatial light pattern and in a third camera shot a third image of the second component of the spatial light patter.

4. Sensor device according to claim 1, wherein at least one illuminator of said first and second illuminators includes an internal pattern generator arranged for light to follow the path from a light source of the at least one illuminator, via said internal pattern generator, to said camera, and so as to create a third spatial light pattern component of said spatial light pattern, and wherein the camera is enabled to capture in said first single camera shot said composite image of said spatial light pattern including also said third spatial light pattern component.

5. Sensor device according to claim 1, wherein the camera is arranged to capture in a single camera shot the composite image composed by imaging together a multitude of spatial light patterns.

6. Sensor device according to claim 1, wherein a photosensitive part of the said camera is a one-dimensional, 1D, line camera sensor array.

7. Sensor device according to claim 1, wherein the photosensitive part of the said camera is a two-dimensional, 2D, area camera sensor array.

8. Sensor device according to claim 1, wherein the said camera is adapted to capture a high speed one-dimensional, 1D, line image or two-dimensional, 2D, area image with an image capturing rate of at least 1000 per second.

9. Sensor device according to claim 1, wherein in an optical configuration, the optical axis of the said illuminator is coaxial with an optical axis of the said camera of the same optical configuration.

10. System for determining a position of a machine part in a computer-controlled machine having a movable carrier for changing the position of a first machine part relative to that of a second machine part, comprising
a sensor device according to claim 1,
a data storage means adapted to store
a) reference image data of first and second spatial light pattern component images captured separately with the sensor device in a reference machine in which the movable carrier is a corresponding movable reference carrier and
b) reference position data of the reference carrier associated with the reference image data, and
a processing means in communication with the sensor device and the storage means and configured to determine a correspondence of composite image data communicated from the sensor device with reference image data communicated from the storage means, to derive light pattern translation offset data for a pair of corresponding composite image data and reference image data, and to derive translation and rotation data for position reading or calibration of the computer-controlled machine based on light pattern translation offset data related to a plurality of different optical configurations.

11. Method for acquiring the translation and rotation of a first part relative to the translation and rotation of a second part of a computer-controlled machine having at least one movable carrier for changing the position of the first machine part relative to that of the second machine part, the method comprising providing a pattern generator attachable to the first machine part, providing a first coherent light illuminator and a second coherent light illuminator both being attachable to the second machine part and being optically configured to illuminate the pattern generator with coherent light for creating a spatial light pattern, providing a camera being attachable to the second machine part and being optically configured to capture a composite image of said spatial light pattern, and enabling said camera so as to capture a first composite image of said spatial light pattern in a first single camera shot using a combination of said camera and said first one of a coherent light illuminator and said second one of a coherent light illuminator in which a range of effective optical distances of a first optical configuration in which light is propagated along optical paths from said first illuminator via the pattern generator to said camera for creating a first spatial light pattern component of said spatial light pattern is not overlapping with a range of effective optical distances of a second optical configuration in which light is propagated along optical paths from said second illuminator via the pattern generator to said camera for creating a second spatial light pattern component of said spatial light pattern, and each of said first and said second illuminators being configured to illuminate the pattern generator with coherent light of a coherence length that is larger than a maximum difference in optical path lengths within each of the first and second optical configurations.

12. Method for acquiring at a plurality of machine part positions the translation and rotation of a first part relative to the translation and rotation of a second part of a computer-controlled machine having at least one movable carrier for changing the position of the first machine part relative to that of the second machine part, comprising moving the movable carrier to a plurality of positions, and at each position, performing the method of claim 11 and recording in a data storage means the captured composite image and associated carrier position data related to the position of said carrier.

13. Method according to claim 12, wherein at each position of the carrier the first and second illuminators are controlled to operate alternately so as to capture images of said first and second spatial light pattern components separately and non-concurrently and only in respective ones of the first and second different optical configurations.

14. Method according to claim 12, wherein composite images are recorded at each position of the carrier using a plurality of said cameras configured to record images in respective different object planes.

15. Method of deriving data for calibration or improving the relative positioning of parts of a computer-controlled machine comprising a movable carrier for changing the position of a first machine part relative that of second machine part, wherein the method comprises providing a sensor device according to claim 1 in the computer-controlled machine, moving the carrier to a plurality of carrier positions such that the position of the first machine part relative to that of the second machine part changes for each of said plurality of positions and, at each carrier position, recording position data related to the position of said carrier and operating the sensor for capturing and recording composite image data of composite images of spatial light patterns composed of at least a first and a second spatial light pattern components in respective ones of the first and second optical configurations, and processing a recorded composite image data with reference image data of a reference database comprising interrelated, separately recorded reference image and position data related to the first and second spatial light pattern components imaged and captured using the sensor device in a reference machine and finding pairs of corresponding composite image data and reference image data, deriving image translation offset data for each pair of corresponding composite image data and reference image data, and deriving translation and rotation data for calibration or improving the relative positioning of parts of the computer-controlled machine based on light pattern translation offset data related to the first and second optical configurations.

\* \* \* \* \*